Figure 1:
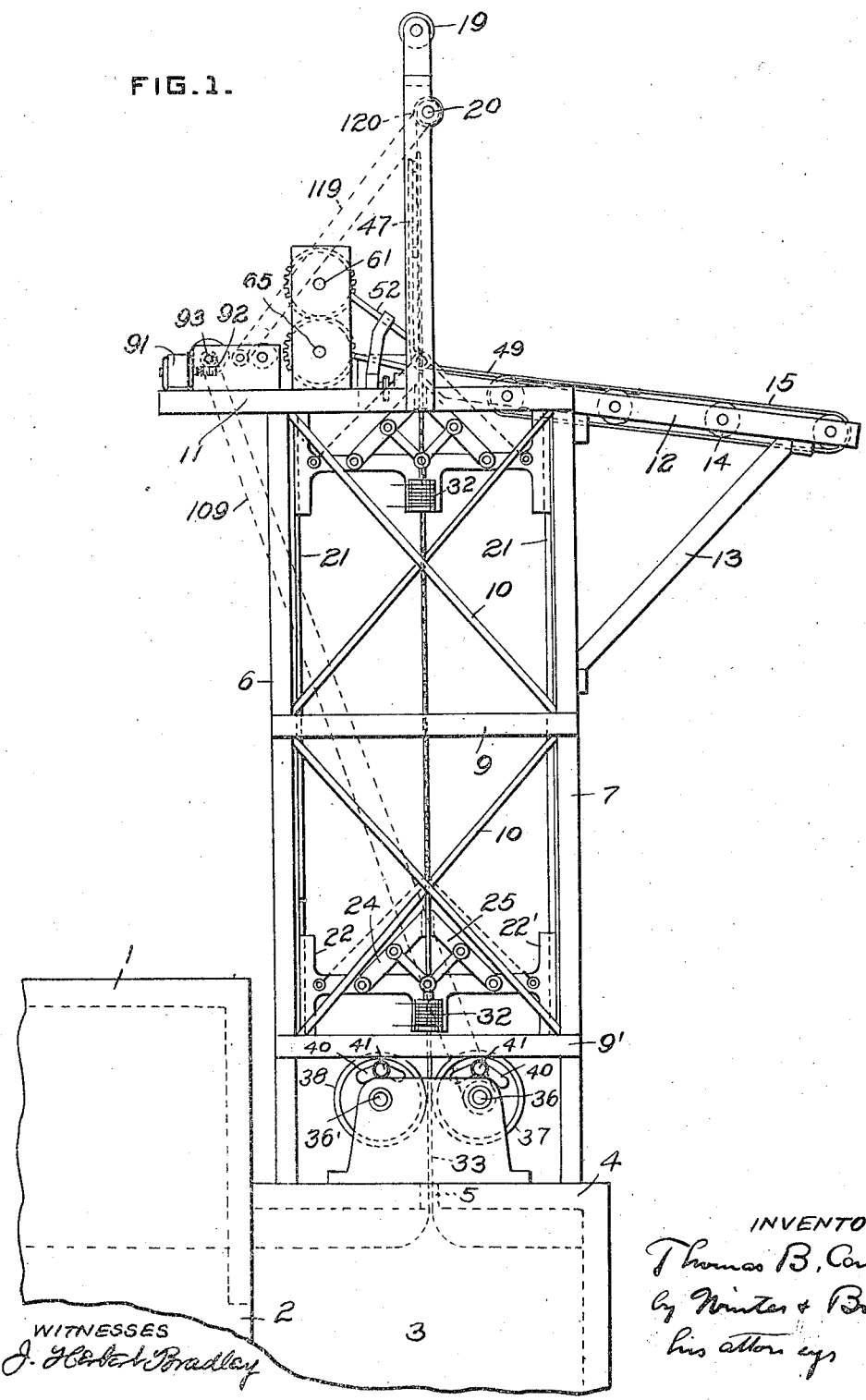

Sept. 9, 1924.

T. B. CAMPBELL, JR 1,508,049

APPARATUS FOR DRAWING SHEET GLASS

Filed Dec. 23, 1921  4 Sheets-Sheet 1

INVENTOR
Thomas B. Campbell Jr
by Winter & Brown
his attorneys

WITNESSES
J. Herbert Bradley

Sept. 9, 1924.
T. B. CAMPBELL, JR
1,508,049
APPARATUS FOR DRAWING SHEET GLASS
Filed Dec. 23, 1921  4 Sheets-Sheet 2
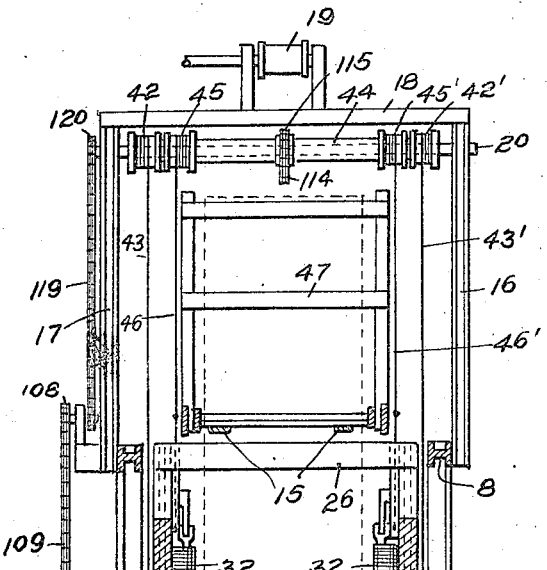
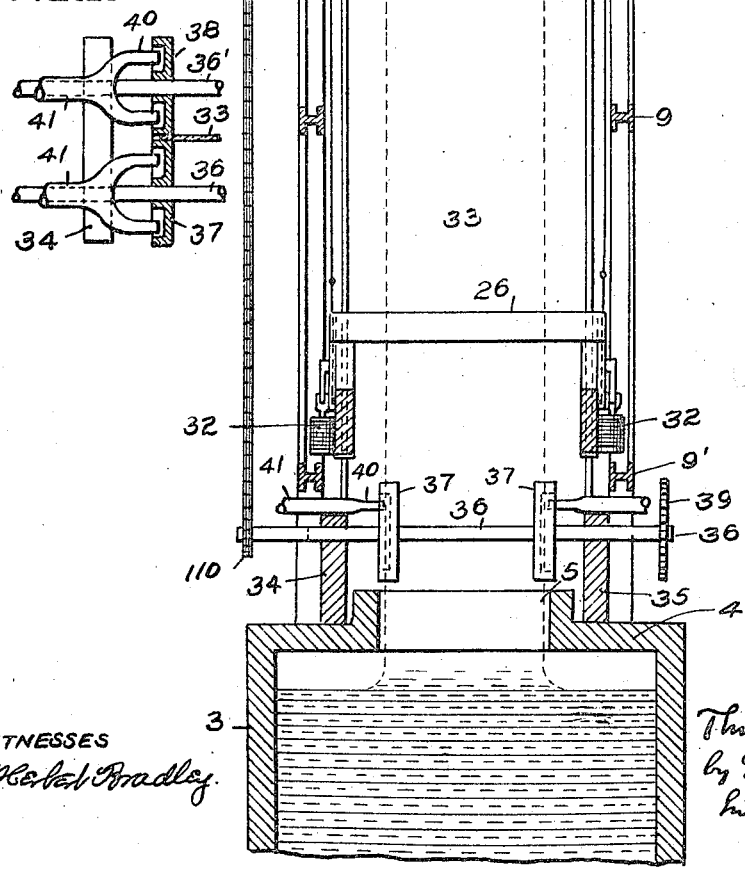
WITNESSES
J. Herbert Bradley
INVENTOR
Thomas B. Campbell Jr.
by Winter & Brown
his attorneys Sept. 9, 1924.

T. B. CAMPBELL, JR 1,508,049

APPARATUS FOR DRAWING SHEET GLASS

Filed Dec. 23, 1921    4 Sheets-Sheet 3

WITNESSES
J. Herbert Bradley

INVENTOR
Thomas B. Campbell Jr.
by Winter & Brown
his attorneys

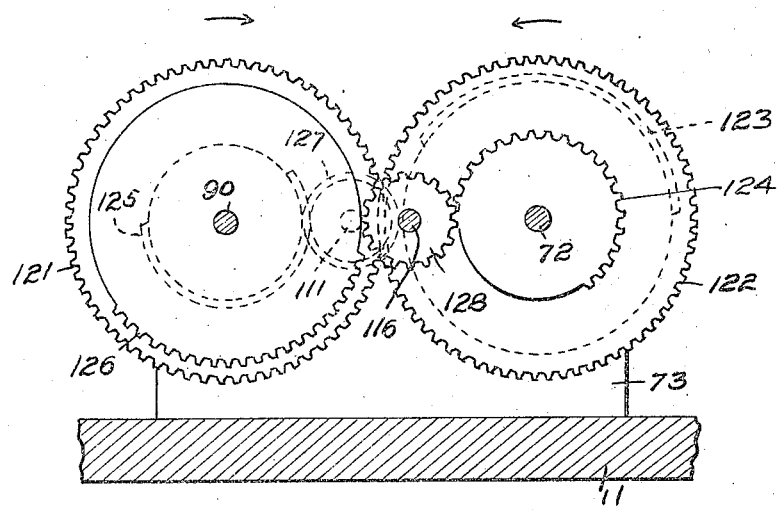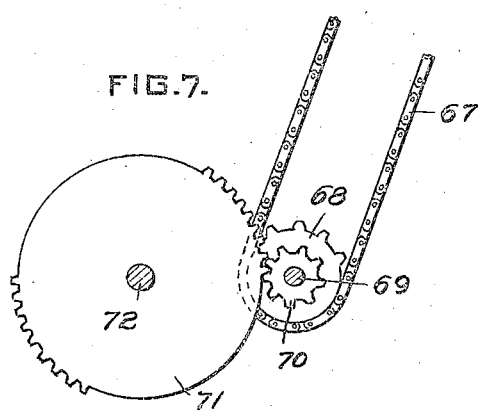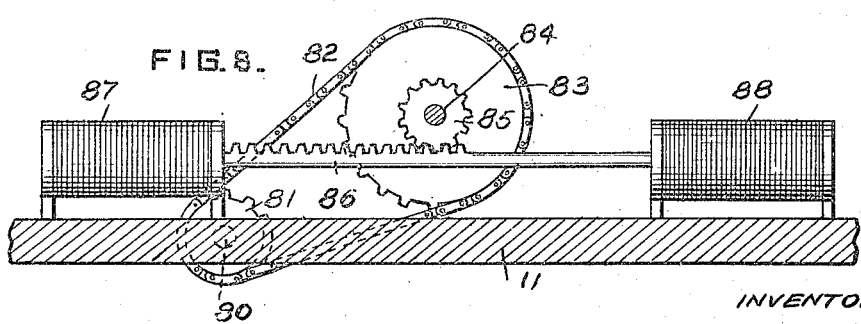

Patented Sept. 9, 1924.

1,508,049

UNITED STATES PATENT OFFICE.

THOMAS B. CAMPBELL, JR., OF PITTSBURGH, PENNSYLVANIA.

APPARATUS FOR DRAWING SHEET GLASS.

Application filed December 23, 1921. Serial No. 524,531.

*To all whom it may concern:*

Be it known that I, THOMAS B. CAMPBELL, Jr., a citizen of the United States, and a resident of Pittsburgh, in the county of Allegheny and State of Pennsylvania, have invented a new and useful Improvement in Apparatus for Drawing Sheet Glass, of which the following is a specification.

This invention relates to glass drawing apparatus, particularly to that type employed for drawing sheet-glass and has for an object the provision of a machine which is simple and durable in construction, which is free from parts which will readily get out of order and which is efficient in operation.

Special objects of the invention are to provide means whereby a sheet of glass may be continuously drawn at a constant rate of speed in a rectilinear path, to provide means for automatically and periodically severing suitable sizes or sections of the drawn sheet and transferring them to the leers, to provide simplified cooling means for the gripping rolls used in conjunction with the drawing mechanism proper, to provide mechanism for drawing the sheet comprising a pair of reciprocating gripping frames, and to provide an apparatus in which the gripping rolls, drawing frames and cutting and transferring mechanism are in alignment to assure the complete formation of the glass sheet while traveling in a rectilinear path.

These and other objects of the invention will more readily appear when taken in connection with the following description and the appended claims.

Figure 4:
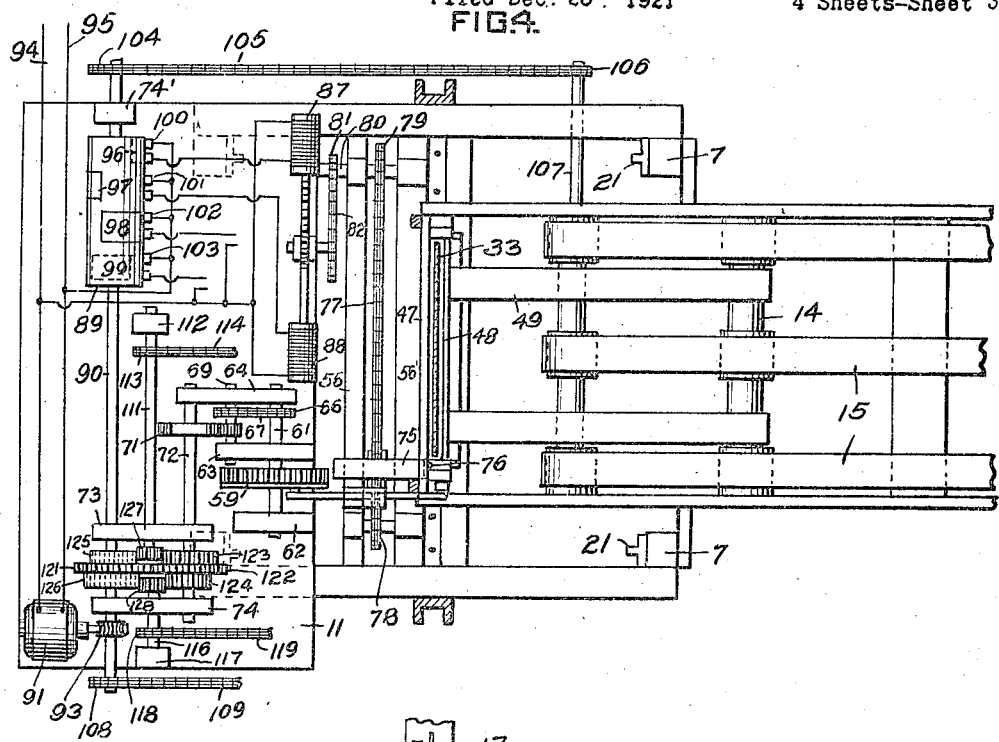
Figure 5:
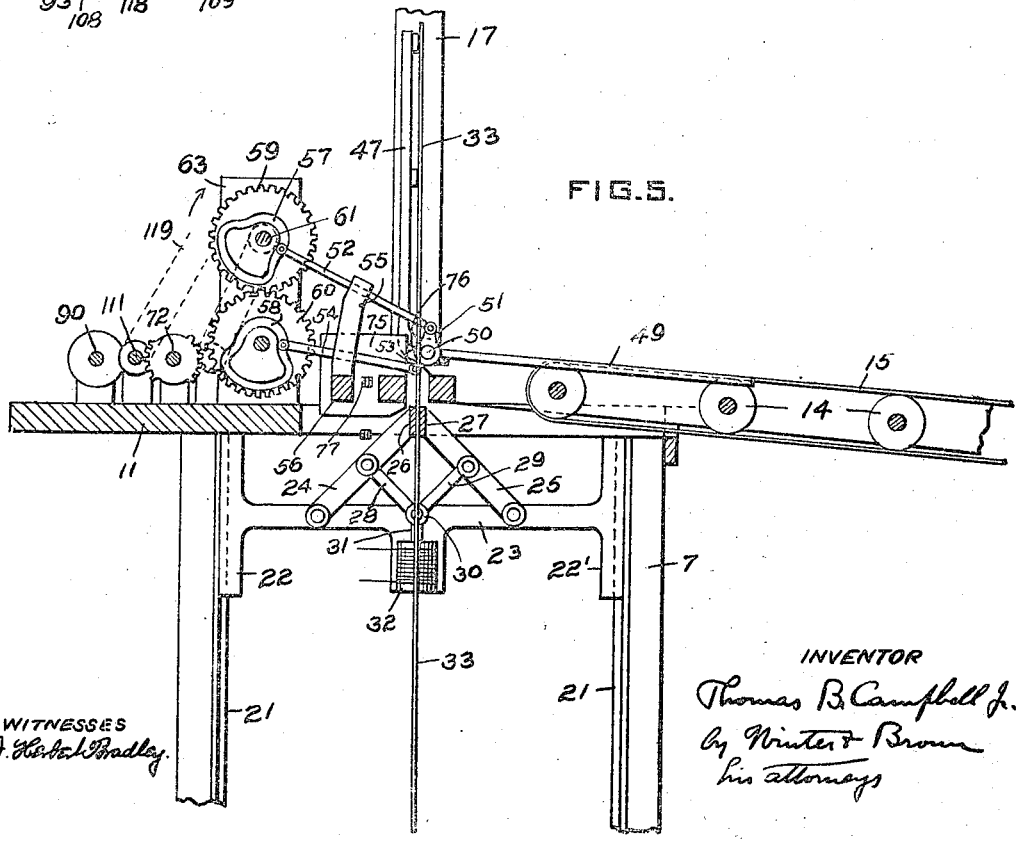

In the accompanying drawings, Fig. 1 is a side elevation illustrating the preferred embodiment of the invention; Fig. 2 a vertical sectional view of the apparatus shown in Fig. 1; Fig. 3 an enlarged detail view of the gripping rolls and the cooling means used in connection therewith; Fig. 4 a plan view showing the arrangement of the operating mechanism and the conveyor for carrying the formed plates to the leer; Fig. 5 a transverse sectional view with parts in elevation of the mechanism illustrated in Fig. 4; Fig. 6 an enlarged detail view of the gearing employed for actuating the drawing frames; Fig. 7 a similar view of the gear for acuating the breaking mechanism, and Fig. 8 an enlarged detail view of the magnetic actuating device.

In carrying out this invention the glass may be melted in an ordinary hearth 1 of which the drawings show only the end which the glass reaches when ready to be worked. This hearth communicates by opening 2 with a small reservoir 3 receiving the glass which is to be drawn into sheets or plates. The top 4 of the reservoir is provided with an opening 5 through which the molten glass is drawn. Surmounting the reservoir and disposed above the opening therein is a supporting frame work designated as a whole by the numeral 6 and comprising the upright joists 7, the transverse members 8, 9, 9′ and the braces 10. Located at the top of the frame work is a platform 11 on which the operating mechanism for the several parts together with its driving motor is mounted. Located at one side thereof is a belt conveyor 12 the body of which is suitably braced as at 13. This conveyor is of the usual endless belt type, its rollers and belt being indicated at 14 and 15 respectively.

A pair of uprights 16 and 17 bridged by a cross piece 18 carrying the drum 19 are mounted upon the upper end of the frame work 6 in which is journaled the shaft 20 for actuating the drums for hoisting one of the drawing frames presently to be described.

The joists 7 are provided with guides 21 on which the drawing frames for gripping the sheet of glass ride. A pair of such frames are employed in the embodiment illustrated, one reciprocating in the upper portion and the other in the lower portion of the frame work. Since both frames are of identical construction it will be necessary to particularly describe but one of them. Each frame consists of side blocks 22, 22′ connected by the intermediate member 23. Pivoted to member 23 at each side of its center are the sections 24 and 25 carrying the respective gripping strips 26, 27.

A link 28 is pivoted to section 24, and a similar link 29 to section 25, the two links being pivotally connected at 30 to a rod 31 forming an extension of the movable core of solenoid 32 fixed to the member 23. Each side of both the upper and lower drawing frames is constructed as described and the gripping strips 26, 27 extend therebetween. Due to the inclination of sections 24, 25 and the weight of the parts connected thereto it is evident that the strips 26, 27 are forced towards each other to grip the sheet of glass being drawn which is indicated at 33, whenever the solenoids are de-energized.

Mounted in bearing blocks 34, 35 disposed at opposite sides of the opening 5 are the shafts 36, 36' carrying the cooperating pairs of gripping rolls 37, 38 which are adapted to grip the edges of the glass sheet 33, as clearly shown in Figs. 2 and 3, such shafts being connected by suitable gearing 39 so as to rotate in unison. In order to keep the gripping rolls from becoming too hot, the nozzles 40 are provided for directing an air blast against the sides thereof. Air is led by any suitable means to the body portion 41 of the nozzles, from which it is delivered to the two branches terminating in close proximity of the rolls.

Fixed to the shaft 20 are the gripping drums 42, 42' about which are wound the cables 43, 43', the lower ends of which are attached to the lower drawing frame. Loosely mounted upon the shaft 20 between the drums 42, 42' is a sleeve 44 having hoisting drums 45, 45' fixed thereto about which are wound cables 46, 46' attached to the upper drawing frame.

Mounted upon suitable supporting members at the top of the frame work 6 above the upper limit of movement of the drawing frames and in alignment with the pass between the gripping rolls and the transverse gripping strips 26, 27 is a combined breaking and transferring mechanism comprising a bending section 47 and a transferring section 48 having arms 49 which extend between the belts of the conveyor when in the position shown in Figs. 4 and 5. Each of these sections is pivoted on a common axis 50 slightly offset from the path of travel of the glass sheet 33 so that the drawn sheet may readily pass therebetween. An upwardly extending ear 51 on section 47 is pivotally connected to rod 52, and a similar downwardly extending ear 53 on the section 48 is likewise connected to a rod 54, both rods being guided in bracket 55 on cross piece 56. The ends of rods 52 and 54 operatively engage cam grooves 57, 58 formed in the faces of gears 59 and 60 respectively.

The gear 59 is fixed to a shaft 61 journaled in bearing blocks 62, 63, 64 upon platform 11 and the gear 60 is fixed to a shaft 65 similarly mounted. In order to rotate said gears, shaft 61 has attached thereto between bearing blocks 63, 64, sprocket wheel 66 with which a chain 67 engages, said chain being driven by sprocket wheel 68 on the shaft 69 journaled in blocks 63, 64. Shaft 69 also carries a pinion 70 driven by a mutilated gear 71 fixed to shaft 72 journaled in bearing blocks 64, 73 and 74, the two last named blocks being also mounted upon the platform 11.

The mechanism for cutting the drawn sheet of glass prior to its being broken by the bending section of the transferring mechanism above described is also disposed above the upper limit of travel of the drawing frames and comprises a cutter block 75 in which the cutter 76 is fixed, said block being mounted for reciprocation upon the cross piece 56 and a similar cross piece 56' slightly spaced therefrom. Block 75 is attached to the upper limb of an endless chain 77 engaging sprocket wheels 78 and 79 fixed to shafts suitably journaled at opposite sides of the frame work, as clearly shown in Fig. 4. The shaft 80 to which the wheel 79 is fixed carries a pinion 81 driven by means of chain 82 meshing with gear 83 on stub shaft 84. A pinion 85 fixed to the stub shaft is engaged by a rack 86, the opposite ends of which are connected to the movable cores of the respective solenoids 87, 88. The parts are so designed that reciprocation of the rack 86 upon energization of either solenoid will through the gearing just described cause the block 75 with its cutter 76 to move entirely across the sheet 33 and a sufficient distance there-beyond to avoid interference with the upward travel of the sheet 33.

For alternately energizing the solenoids 87 and 88, and for energizing the solenoids 32 to release the gripping action of the drawing frames during downward movement thereof, a contact drum 89 fixed to shaft 90 journalled in bearing blocks 74 and 74' is provided, shaft 90 being rotated by means of an electric motor 91 which is operatively connected thereto by worm 92 and worm gear 93, the leads for the motor being indicated at 94 and 95. The drum 89 has mounted thereon a series of contact plates 96, 97, 98 and 99 for bridging the pairs of terminals 100, 101, 102 and 103 and so disposed so as to close the circuits of the solenoids 87, 88, the upper and the lower solenoids 32, respectively, in the proper sequence and for the desired duration.

The shaft 90 extends slightly beyond the frame work 6 and has a sprocket gear 104 fixed thereon through which a chain 105 engaging a similar gear 106 fixed to a shaft 107 is driven for actuating the belts 15 of the conveyor previously described. Fixed to its other extremity is a sprocket gear 108 engaged by chain 109 which drives the gear 110 carried on one end of shaft 36 for rotating the gripping rolls 37.

A shaft 111 journalled in bearing blocks 73 and 112, carries a gear 113 meshing with a chain 114 engaging the gear 115 for rotating the sleeve 44, and a short shaft 116 journalled in bearing blocks 74 and 117 has fixed thereto a sprocket wheel 118 with which a chain 119 engages for driving the gear 120 on the extremity of shaft 20.

In order to reciprocate the drawing frames the shaft 20 and the sleeve 44 are alternately rotated in opposite directions, and in order to cause the frames to rise at a constant and uniform speed and descend rapidly to assure at least one of the frames moving upwardly at all times, the following mechanism is provided: Shafts 90 and 72 have the similar gears 121, 122 respectively, fixed thereto which are adapted to mesh with each other, and fixed to shaft 72 on the opposite sides of gear 122 are gears 123 and 124 both of which are mutilated. Shaft 90, likewise, carries mutilated gears 125, 126 on opposite sides of the gear 121, the gear 123 being identical to gear 126 and gear 124 being identical to gear 125. A pinion 127 fixed to shaft 111 meshes with gears 123, 125, and a corresponding pinion 128 of like size fixed to shaft 116 meshes with gears 124 and 126. Gears 123 and 126 have teeth throughout a portion of their extent while gears 124 and 125 are provided with teeth throughout the greater extent of their peripheries, the sum of the angular extents throughout which teeth are provided on either pair of gears 124, 126 or 123, 125 being equal to 360 degrees. However, each of the several gears is provided with the same number of teeth.

Motor 91 constantly rotates shaft 90 through the worm and worm wheel 92, 93 and since shafts 90 and 72 are connected by the similar gears 121, 122, it is obvious that said shafts together with their respective gears are constantly rotated in opposite directions at the same speed. It is obvious that pinion 128 is first rotated in one direction by gear 124 and then in the opposite direction an equal number of turns by gear 126 during each revolution of shaft 72, and pinion 127 is likewise rotated by the gears 123, 125. It is also apparent that during engagement of gears 123 and 126 with its respective pinion, the same will be rotated at a higher speed than when engaged by the smaller gears 124, 125. Shaft 116 is connected through chain 119 to the shaft 20 to cause rotation of drums 42, 42′ to raise the lower drawing frame during engagement of the smaller gear 124 and to lower said frame during engagement of the larger gear 126 with pinion 128. Similarly, shaft 111 is connected through chain 114 to sleeve 44 to rotate drums 45, 45′ to raise the upper drawing frame during engagement of the small gear 125 and to lower said frame during engagement of the larger gear 123 with pinion 127. It is also noted that the relative angular extent of the small and large gears is such that one of the smaller gears is always in mesh with either pinion 127 or 128 so that one of the drawing frames is at all times moving in an upward direction to effect the drawing of glass sheet 33. The shaft 72 carries the mutilated gear 71 which causes pinion 70 and consequently through the chain 67 and shaft 61 intermittent rotation of gears 59 and 60. The number of teeth in each group on gear 71 corresponds to that on pinion 70 and gears 68 and 66 are identical so that a complete revolution of gears 59 and 60 is assured at each actuation of said pinion, and the number of said groups of teeth corresponds to the total number of contacts 96 and 97, so that the breaking mechanism is actuated after each revolution of the cutter across the drawn sheet. The cam grooves provided on the face of said gears are so shaped and disposed as to maintain the bending section 47 in the position shown in Fig. 5 throughout the greater portion of the revolution of gear 60. The transferring section 49 is then moved upwardly into contact with the sheet, thus gripping the sheet between the two sections. Both sections 47, 49 are then simultaneously rocked towards the right about 60 degrees breaking off a plate or pane of sheet 33 at the line previously marked by cutter 76, the bending section being returned to its initial position while the transferring section continues its movement until it finally reaches the position indicated in Figs. 4 and 5. Just before section 48 reaches this extreme limit of movement towards the right, the arms 49 supporting the severed plate of glass pass below the upper limbs of the conveyor belt 15 depositing the plate thereon which is carried by the conveyor to the annealing leers, not shown.

In order to start the apparatus the glass in the reservoir should be brought to the proper consistency at which time a bait of any suitable construction is lowered by means of the drum 19, the sections of the breaking mechanism and of the drawing frames being positioned so as to permit the bait to pass between them. After the drawn sheet has been initially started by raising the bait and the sheet is engaged by the gripping rolls 37 the sections of the drawing frames are permitted to also grip the sheet and the upper end of the sheet cut to remove the bait, after which the motor 91 is started to put the machine into operation.

The gripping rolls 37 not only assist in the drawing of the sheet but function to maintain a uniform width thereof during the drawing operation, and the use of an air cooling blast for said rolls eliminates the necessity for cumbersome water cooling apparatus so frequently found in connection with glass drawing machines.

The several mechanisms above described are so designed and associated that the single electric motor 91 operates the complete machine, actuating the mechanism to release the drawing frames, to move the cutting device, and to rock the breaking mechanism, the several steps being performed in the proper sequence and in timed relation by the controlling apparatus described.

The general operation of the machine is as follows: The alternate rotation of shafts 111, 116 in opposite directions and at different rates of speed by the gearing illustrated in Fig. 6 causes the sets of hoisting drums 42, 42′ and 45, 45′ to be similarly rotated. Movement of the drums due to the cable connections to the drawing frames causes said frames to be reciprocated in the framework, upward movement thereof being at a uniform constant speed and their downward movement at an increased speed. Due to the gearing employed, one of the frames is moved upwardly at all times during which movement strips 26, 27 contact with the sheet of glass to grip the same and effect the drawing operation. As soon as a drawing frame reaches its upward limit of movement the contacts 98 or 99 bridge the terminals 102 or 103 to energize the solenoids 32 to retract strips 26, 27 of its associated frame to release its gripping action, such solenoids being energized during the entire downward travel of the frames. This assures the sheet being drawn at a constant speed resulting in a homogeneous product.

The drawn sheet passes above the main frame work and between sections 47 and 48 of the breaking and transferring mechanisms, and at each revolution of the drum 89 one of the contacts 96 or 97 momentarily bridges the terminals 100 or 101 to energize either the solenoid 87 or 88 to draw the cutter 76 across the face of the glass sheet. The solenoids are energized alternately so that the cutter is reciprocated across the face of the sheet, cutting a pane first by movement in one direction and the succeeding pane by movement in the opposite direction.

Following the actuation of the cutter, one of the groups of teeth on gear 71 engages pinion 70 to bring the breaking mechanism into play, the bending section 47 causing the plate or pane to be broken along the line previously marked by the cutter 76, and the continuing movement of the transferring section 48 depositing the severed portions upon the belt conveyor to be carried to the leers.

It is thus seen that the invention provides a complete sheet-glass drawing apparatus operated by a single motor in which the sheet is drawn continuously at a constant speed by a pair of reciprocating drawing frames of simple and durable construction, one in which the sheet is completely drawn without changing its direction of movement, that is in a rectilinear direction, one in which the several steps such as drawing, cutting, breaking and transferring the drawn plate, are automatically accomplished by mechanism free from complicated parts liable to get out of order, and one which may be constructed at a nominal cost.

As required by the patent statutes the preferred embodiment has been illustrated and described but it is evident that various changes in construction may be made without departing from the spirit of the invention, and it is not intended to limit the invention beyond that particularly pointed out and defined in the appended claims.

I claim:

1. A sheet-glass drawing apparatus comprising a framework, a plurality of reciprocating drawing frames mounted therein including cooperating gripping members pivoted to the frames and disposed at opposite sides of the drawn sheet, means for moving the gripping members into contact with the drawn sheet during movement of the frame in one direction, means for moving said gripping members entirely out of contact with the drawn sheet during movement of the frame in the opposite direction, and means for maintaining one of said frames in movement at a uniform speed in a single direction at all times.

2. A sheet-glass drawing apparatus comprising a framework, a plurality of drawing frames mounted therein including a pair of oppositely disposed cooperating gripping members pivotally connected to each of the frames, means for normally urging said gripping members towards each other during movement of the frame to which they are connected in one direction, means for bodily moving both of said gripping members away from each other during movement of the frame in the opposite direction, means for moving the drawing frames in said first named direction at a constant speed, and means for maintaining at least one pair of said gripping members at all times in gripping relation with the sheet being drawn.

3. A sheet-glass drawing apparatus comprising a framework, a reciprocating drawing frame mounted therein including a pair of cooperating gripping members adapted to be disposed at the opposite sides of the drawn sheet pivoted to the frame, means for bodily moving both of the said gripping members into contact with the drawn sheet during movement of the frame in one direction, means for bodily moving both of said members entirely out of contact with the drawn sheet during movement of the frame in the opposite direction, and means for moving the said frame at a uniform speed during its movement in said first named direction.

4. A sheet-glass drawing apparatus comprising a frame-work, a plurality of reciprocating drawing frames mounted therein, a revoluble drum for actuating each of said frames, cables twined around said drums and connected to one of said frames, means for intermittently placing said frames in gripping relation with the drawn sheet, and means for intermittently revolving the drum to which it is connected at a uniform speed and in a predetermined direction whereby to effect a drawing action upon the sheet being gripped.

5. A sheet-glass drawing apparatus comprising a framework, a pair of reciprocating drawing frames mounted therein and provided with bodily movable gripping sections between which the sheet being drawn is gripped during upward movement of the frames, a pair of rotatable drums, a cable twined about each of said drums and connected to one of said frames, means for intermittently moving the said pivoted sections into and out of gripping relation with the drawn sheet, and means for intermittently rotating said drums in opposite directions.

6. A sheet-glass drawing apparatus comprising a framework, a plurality of vertically reciprocating drawing frames adapted to intermittently grip the sheet being drawn, means for moving the drawing frames upwardly at a uniform and constant speed, means for keeping at least one of said frames reciprocating upwardly at all times, and means for causing said frames to move downwardly at a greater speed than during their upward movement.

7. A sheet-glass drawing apparatus comprising a framework, a pair of vertically reciprocating drawing frames provided with bodily movable pivoted sections between which the sheet being drawn is gripped during upward movement of the frames, means for urging said pivoted sections into gripping relation with the drawn sheet during upward movement of the frames, means for moving said frames upwardly at a uniform constant speed, means for maintaining at least one of said frames moving upwardly at all times, and means for bodily moving the said sections entirely out of contact with the drawn sheet for releasing the gripping action thereof during the downward movement of the frames.

8. A sheet-glass drawing apparatus comprising a framework, a pair of reciprocating drawing frames having pivoted sections between which the sheet being drawn is gripped during upward movement of the frames, solenoids operatively connected to said sections to separate the same, means for moving the frames upwardly at a uniform constant speed, means for maintaining at least one of said frames in upward movement at all times, and means for energizing the solenoids to release the gripping action of the frames during their downward movement.

9. A sheet-glass drawing apparatus comprising a reservoir having an opening therein, a main supporting framework above said opening, drawing frames reciprocating therein, gripping rolls disposed between the frames and opening, and breaking mechanism above said frames, the gripping rolls, drawing frames and breaking mechanism being in substantial alignment whereby the sheet is completely formed during rectilinear movement thereof.

10. A sheet-glass drawing apparatus comprising a reservoir having an opening in its top, a supporting framework above the opening, air-cooled rollers adjacent said opening for gripping the edges of the drawn sheet, vertically reciprocating drawing frames mounted in the framework, and breaking mechanism pivoted above the upper limit of travel of the drawing frames, the opening, gripping rolls, drawing frames, and breaking mechanism being disposed in substantially vertical alignment.

11. A sheet-glass drawing apparatus comprising a reservoir provided with an opening, a supporting framework positioned above the reservoir, a pair of cooperating gripping rolls disposed above and at each side of said opening, drawing frames composed of pivoted sections mounted for vertical reciprocation in the framework, and a breaking mechanism also composed of pivoted sections, the opening, gripping rolls, drawing frames and breaking mechanism being in substantially vertical alignment, whereby rectilinear movement of the drawn sheet will cause the same to pass between the rolls and sections of the frames and breaking mechanism.

12. A sheet-glass drawing apparatus comprising a reservoir having an opening at its top, a supporting framework above the opening, air-cooled rollers adjacent said openings for gripping the edges of the drawn sheet, vertically reciprocating drawing frames mounted in the framework, and breaking mechanism pivoted above the upper limit of travel of the drawing frames, the opening, gripping rolls, drawing frames and breaking mechanism being in substantially vertical alignment, a conveyor mounted on the framework adjacent the breaking mechanism, and means for rocking the breaking mechanism to sever and deposit the formed plates on said conveyor.

13. A sheet-glass drawing apparatus comprising a reservoir having an opening at its top, a supporting framework above the opening, air-cooled rollers adjacent said opening for gripping the edges of the drawn sheet, vertically reciprocating drawing frames mounted in the framework and breaking mechanism pivoted above the upper limit of travel of the drawing frames, the opening, gripping rolls, drawing frames and breaking mechanism being in substantially vertical alignment, a conveyor belt mounted on the framework adjacent the breaking mechanism, the arms of which are adapted to rock so as to move below the upper surface of the belt, and means for periodically rocking the breaking mechanism to sever and deposit the formed plates on the belt.

14. A sheet-glass drawing apparatus comprising a reservoir having an opening, a supporting framework above the opening, drawing frames reciprocating therein, gripping rolls disposed between the frames and opening, cutting mechanism above the upper limit of travel of the drawing frames, breaking mechanism provided with a bending section and transferring section pivoted adjacent and above the cutting mechanism between which sections the drawn sheet is adapted to pass, a conveyor mounted at one side of the framework, and means for periodically and simultaneously rocking both of said sections to sever the formed plates, for returning the bending section to normal position, and for continuing the said rocking movement of the transferring section to deposit the formed plates on said conveyor.

In testimony whereof, I sign my name.

THOMAS B. CAMPBELL, Jr.